(12) United States Patent
Tsuyuki

(10) Patent No.: US 9,677,499 B2
(45) Date of Patent: Jun. 13, 2017

(54) CONTROL DEVICE OF INTERNAL COMBUSTION ENGINE

(75) Inventor: Takeshi Tsuyuki, Hadano (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 360 days.

(21) Appl. No.: 13/983,632

(22) PCT Filed: Jan. 11, 2012

(86) PCT No.: PCT/JP2012/050388
§ 371 (c)(1),
(2), (4) Date: Aug. 5, 2013

(87) PCT Pub. No.: WO2012/108223
PCT Pub. Date: Aug. 16, 2012

(65) Prior Publication Data
US 2013/0311069 A1 Nov. 21, 2013

(30) Foreign Application Priority Data
Feb. 7, 2011 (JP) ................. 2011-023880

(51) Int. Cl.
*F02D 43/04* (2006.01)
*F02D 23/02* (2006.01)
(Continued)

(52) U.S. Cl.
CPC ......... *F02D 43/04* (2013.01); *F02D 13/0215* (2013.01); *F02D 13/0261* (2013.01);
(Continued)

(58) Field of Classification Search
CPC ....... Y02T 10/18; Y02T 10/144; Y02T 10/46; Y02T 10/47; Y02T 10/42; Y02T 10/123;
(Continued)

(56) References Cited

U.S. PATENT DOCUMENTS 5,640,939 A * 6/1997 Shimada ................. F02D 37/02
123/306
5,778,856 A * 7/1998 Okada ..................... F02D 37/02
123/406.47
(Continued)

FOREIGN PATENT DOCUMENTS

JP 61-087922 A 5/1986
JP 63-248973 A 10/1988
(Continued)

OTHER PUBLICATIONS

Japanese Office Action dated Dec. 2, 2014, 3 pgs.

*Primary Examiner* — Joseph Dallo
(74) *Attorney, Agent, or Firm* — Foley & Lardner LLP

(57) ABSTRACT

There is provided a control device of an engine that includes a turbo-supercharger and a variable valve mechanism, the control device including: a valve timing change means; an ignition timing change means; a fuel injection amount change means; an acceleration request detection means; a supercharging pressure detection means; and an acceleration control means that corrects, when the acceleration request is detected, retarding of ignition timing in a low supercharging region where the supercharging pressure is lower than a predetermined value, that completes the correction of the retarding of the ignition timing in a high supercharging region where the supercharging pressure is equal to or higher than the predetermined value to provide a valve overlap and that changes the fuel injection amount such that an air-fuel ratio at which a mixture air of a scavenging gas and an exhaust gas is easily burned within an exhaust passage is provided.

6 Claims, 5 Drawing Sheets

(51) Int. Cl.
*F02D 41/10* (2006.01)
*F02P 5/15* (2006.01)
*F02D 13/02* (2006.01)
*F02D 41/00* (2006.01)

(52) U.S. Cl.
CPC .............. *F02D 23/02* (2013.01); *F02D 41/10* (2013.01); *F02P 5/1504* (2013.01); *F02P 5/1516* (2013.01); *F02D 41/0007* (2013.01); *Y02T 10/144* (2013.01); *Y02T 10/18* (2013.01); *Y02T 10/46* (2013.01)

(58) Field of Classification Search
CPC ........... F02D 41/0007; F02D 2041/001; F02D 13/0261; F02D 13/0219; F02D 13/0207; F02D 41/0002; F02D 37/02; F02D 41/10; F02D 43/04; F02D 13/0215; F02D 23/02; F02P 5/1516; F02P 5/1504
USPC .......... 60/605.1, 605.2, 602, 603; 123/90.15, 123/90.23, 406.12, 406.23, 123/406.45–406.52; 701/102–105
See application file for complete search history.

(56) References Cited

U.S. PATENT DOCUMENTS

| | | | | |
|---|---|---|---|---|
| 6,688,287 | B2* | 2/2004 | Machida | F01L 1/34 123/406.12 |
| 7,801,664 | B2* | 9/2010 | Winstead | F02M 26/01 123/198 F |
| 8,051,835 | B2* | 11/2011 | Soejima | F01N 13/011 123/406.45 |
| 8,135,535 | B2* | 3/2012 | Karnik | F01N 3/10 123/676 |
| 8,186,330 | B2* | 5/2012 | Kobayashi | F01L 1/143 123/406.29 |
| 8,220,263 | B2 | 7/2012 | Tomoda et al. | |
| 2003/0195083 | A1* | 10/2003 | Tabata | F02D 41/022 477/168 |
| 2004/0016419 | A1* | 1/2004 | Satou | F02D 11/105 123/492 |
| 2007/0056560 | A1* | 3/2007 | Trask | F01L 9/04 123/435 |
| 2008/0077304 | A1* | 3/2008 | Suzuki | F02B 37/127 701/102 |
| 2008/0209906 | A1* | 9/2008 | Inoue | F02D 41/0007 60/605.2 |
| 2008/0283025 | A1* | 11/2008 | Sato | F02D 13/0234 123/406.45 |
| 2009/0018756 | A1* | 1/2009 | Storhok | F02D 41/0007 701/105 |
| 2009/0145398 | A1* | 6/2009 | Kemeny | F02B 33/22 123/25 C |
| 2010/0071658 | A1* | 3/2010 | Soejima | F01N 13/011 123/406.19 |
| 2010/0217504 | A1* | 8/2010 | Fujii | F01L 1/344 701/105 |
| 2010/0229806 | A1* | 9/2010 | Kemeny | F02B 33/22 123/2 |
| 2010/0242471 | A1* | 9/2010 | Tomoda | F02D 13/0261 60/602 |
| 2011/0139119 | A1* | 6/2011 | Kobayashi | F01L 1/143 123/406.29 |
| 2011/0203551 | A1* | 8/2011 | Russ | F02D 41/0007 123/406.45 |

FOREIGN PATENT DOCUMENTS

| | | |
|---|---|---|
| JP | 2005-090425 A | 4/2005 |
| JP | 2005-188334 A | 7/2005 |
| JP | 2006-299992 A | 11/2006 |
| JP | 2008-101502 A | 5/2008 |
| JP | 2009-138733 A | 6/2009 |

* cited by examiner

FIG.2

| #1 | INTAKE | COMPRESSION | EXPANSION | EXHAUST | INTAKE | COMPRESSION |
| #3 | EXHAUST | INTAKE | COMPRESSION | EXPANSION | EXHAUST | INTAKE |
| #4 | EXPANSION | EXHAUST | INTAKE | COMPRESSION | EXPANSION | EXHAUST |
| #2 | COMPRESSION | EXPANSION | EXHAUST | INTAKE | COMPRESSION | EXPANSION |

3in   #1sc   #3ex

CONTROL DEVICE OF INTERNAL COMBUSTION ENGINE

TECHNICAL FIELD

The present invention relates to a control device for ignition timing and valve timing of a turbo-supercharger-equipped internal combustion engine.

BACKGROUND ART

In recent years, in terms of enhancing environmental performance or the like, attention has been focused on a vehicle in which the displacement of an internal combustion engine is reduced and which is equipped with a turbo-supercharger for reducing the decrease in output caused by the reduction of the displacement. In order to obtain, in such a vehicle, an acceleration feel of a vehicle equipped with a naturally-aspirated internal combustion engine of large displacement, it is necessary to increase supercharging efficiency to produce a high torque and to reduce a so-called turbo lag.

JP63-248973A discloses that, in a low supercharging region at the time of acceleration, ignition timing is subjected to correction of retarding, and thus the combustion state is brought into an afterburning state to increase the exhaust temperature, with the result that supercharging efficiency is enhanced.

JP2008-101502A discloses that control is performed into valve timing for obtaining a scavenging effect of blowing fresh air into an exhaust system, and an air-fuel ratio when the fresh air blown into the exhaust system is afterburned in the exhaust system is controlled such that the exhaust temperature resulting from the afterburning is the maximum, with the result that supercharging efficiency is enhanced.

SUMMARY OF INVENTION

Incidentally, in the control disclosed in JP63-248973A, supercharging efficiency is improved in only a low supercharging region, and in the control disclosed in JP2008-101502A, supercharging efficiency is enhanced in only a high supercharging region where scavenging can occur. JP63-248973A does not disclose the control of valve timing at all, and JP2008-101502A does not disclose the control of ignition timing at all.

Hence, even if the control disclosed in JP63-248973A and the control disclosed in 2 are combined, timing suitable for changing the control for enhancing supercharging efficiency from control on the correction of retarding of ignition timing to control on valve timing for scavenging is not clear, and it is impossible to enhance acceleration performance in all regions ranging from a low supercharging region to a high supercharging region.

Moreover, the reduction of a so-called turbo lag is not disclosed in any of the patent documents.

Hence, an object of the present invention is to provide a control device that can reduce a turbo lag and enhance acceleration performance in all regions from a low supercharging region to a high supercharging region.

To achieve the above object, according to the present invention, there is provided a control device of an internal combustion engine that includes a supercharger which is driven by exhaust energy and a variable valve mechanism which can change valve timing, the control device including: a valve timing change unit that controls the variable valve mechanism; an ignition timing change unit; a fuel injection amount change unit; an acceleration request detection unit that detects an acceleration request from a driver; a supercharging pressure detection unit that detects a supercharging pressure produced by the supercharger; and an acceleration control unit that corrects, when the acceleration request is detected, retarding of ignition timing in a low supercharging region where the supercharging pressure is lower than a predetermined value, that completes the correction of the retarding of the ignition timing in a high supercharging region where the supercharging pressure is equal to or higher than the predetermined value to provide a valve overlap and that changes the fuel injection amount such that an air-fuel ratio at which a mixture air of a scavenging gas and an exhaust gas is easily burned within an exhaust passage is provided.

The details and the other features and advantages of the present invention will be described in the following parts of the specification and accompanying drawings.

BRIEF DESCRIPTION OF DRAWINGS

FIG. 2 is a diagram for illustrating a scavenging effect.

DESCRIPTION OF EMBODIMENTS

Figure 1:
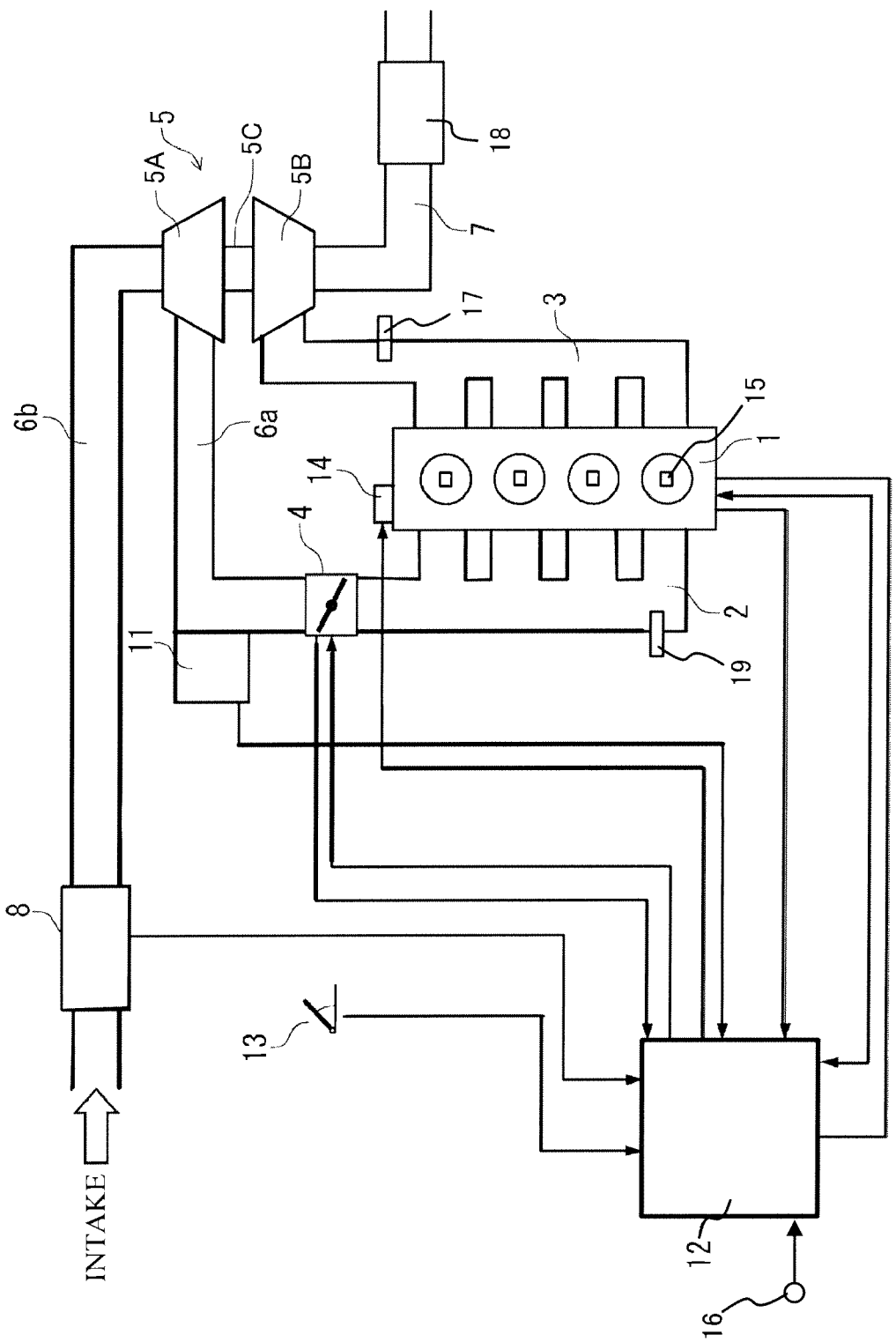
FIG. 1 is a configuration diagram showing an example of a system to which the present invention is applied.

FIG. 1 is a system configuration diagram of an internal combustion engine according to the present embodiment.

In the entrance of an intake manifold 2 of the internal combustion engine 1, a throttle chamber 4 for adjusting the amount of air flowing into the internal combustion engine 1 is provided, and an intake passage 6 is connected to the upstream portion thereof. On the upstream side of the throttle chamber 4 of the intake passage 6, a compressor 5A of a supercharger 5 is arranged, and on the further upstream portion thereof, an air flow meter 8 that detects the amount of air sucked is arranged.

In each cylinder of the internal combustion engine 1, a fuel injection valve 15 that directly injects a fuel into the cylinder is arranged. In an exhaust passage 7, a turbine 5B of the supercharger 5 is arranged.

The supercharger 5 is a so-called turbo-supercharger; the compressor 5A and the turbine 5B are connected through a shaft 5C. Hence, when the turbine 5B is rotated by the exhaust energy of the internal combustion engine 1, the compressor 5A is also rotated, and sucked air is pressured and fed to the downstream side.

On the downstream side of the turbine 5B, an exhaust catalyst 18 for exhaust air purification is arranged. As the exhaust catalyst 18, a three-way catalyst or the like is used.

As a variable valve mechanism 14, any variable valve mechanism can used as long as the variable valve mechanism can vary intake valve closing timing (IVC) such that an overlap period during which both an exhaust valve and an intake valve are opened is produced. For example, a commonly known variable valve mechanism can be used such as a variable valve mechanism that varies the rotational phase of an intake camshaft for a crankshaft or a variable valve mechanism that varies the operating angle of the intake valve. The same variable valve mechanism 14 may be provided on the side of the exhaust valve to variably control the valve timing of the intake valve and the exhaust valve.

A control unit 12 reads parameters on an operation state, such as the amount of sucked air detected by the air flow meter 8, an accelerator pedal opening detected by an accelerator pedal opening sensor 13, a collector pressure detected by an intake air pressure sensor 19 and the rotational speed of the engine detected by an unillustrated crank angle sensor, and controls, based on these parameters, the ignition timing, valve timing, the air-fuel ratio and the like.

Valve timing control and air-fuel ratio control performed by the control unit 12 at the time of acceleration will now be described.

When the pressure within the intake manifold 2 is higher than the pressure within an exhaust manifold 3, the control unit 12 operates the variable valve mechanism 14 such that the valve overlap period during which both the intake valve and the exhaust valve are opened is produced.

This is because, during the valve overlap period, a so-called scavenging effect of blowing fresh air flown in from the intake manifold 2 into the exhaust manifold 3 as scavenging air without being processed is utilized to increase the rotational speed of the turbine 5B, and thus charging efficiency into the cylinder is increased.

This effect will be specifically described with reference to FIG. 2. FIG. 2 shows the step order of an in-line four-cylinder internal combustion engine whose ignition order is the following order: the first cylinder, the third cylinder, the fourth cylinder and the second cylinder. Portions indicated by oblique lines in the figure represent the valve overlap period.

When the valve overlap period is provided, in the exhaust manifold 3, an exhaust gas exhausted from a cylinder in an exhaust step is combined with a scavenging gas in another cylinder in an intake step at that time. For example, an exhaust gas exhausted in an exhaust step #3*ex* in the third cylinder of FIG. 2 is combined with a scavenging gas scavenged during the valve overlap period #1*sc* in the first cylinder in an intake step at that time.

Hence, as compared with a case where no valve overlap period is provided, that is, where no scavenging is provided, the amount of gas introduced into the turbine 5B is increased. Thus, the rotational speed of the turbine 5B is increased, a supercharging pressure produced by the compressor 5A is increased and a collector pressure is increased. Since a residual gas within the cylinder is exhausted by the scavenging together with fresh gas, the charging efficiency of the fresh air into the cylinder is consequently increased.

Since the supercharging pressure is obtained by subtracting the atmospheric pressure from the collector pressure, when the collector pressure is detected, the supercharging pressure is indirectly detected.

Furthermore, the mixture air of the exhaust gas and the scavenging gas combined in the exhaust manifold 3 is burned before flowing into the turbine 5B, and thus the energy for rotating the turbine 5B is further increased, with the result that the supercharging efficiency is enhanced. Hence, the amount of fuel injected is set so as to provide such an air-fuel ratio that the mixture air of an exhaust gas exhausted from a certain cylinder in an exhaust step and a scavenging gas scavenged during the valve overlap period from a cylinder in an intake step at the same time is easily burned before flowing into the turbine 5B. In other words, the amount of fuel injected is set such that the air-fuel ratio within the cylinder is made an air-fuel ratio richer than a theoretical air-fuel ratio, an exhaust gas containing unburned hydrocarbon is exhausted and this exhaust gas is mixed with the scavenging gas to provide an air-fuel ratio for easy burning, for example, the theoretical air-fuel ratio.

For example, when the amount of fuel injected is set for the amount of air sucked in an intake step #3*in* in the third cylinder of FIG. 2, the amount of fuel injected is set so as to provide an air-fuel ratio for easily burning the mixture air of an exhaust gas exhausted in the exhaust step #3*ex* in the third cylinder and a scavenging gas exhausted during the valve overlap period #1*sc* in the first cylinder. In other words, attention is focused on an air-fuel ratio within the third cylinder, the air-fuel ratio is richer than the theoretical air-fuel ratio, and, in an exhaust step, an exhaust gas containing an unburned fuel is exhausted.

In the amount of injected fuel set as described above, all the fuel is injected by injecting the fuel once in one step. Fuel injection timing is after the completion of the valve overlap period in the intake step, that is, after the closing of the exhaust valve or is during a compression step.

When the fuel injection is performed as described above, the fuel that is unburned hydrocarbon in an exhaust gas receives combustion heat in an expansion step, and is thereby changed from a higher hydrocarbon having a long carbon chain to a lower hydrocarbon having a short carbon chain, with the result that the combustion quality is enhanced. Moreover, since the air-fuel ratio within the cylinder is richer than the theoretical air-fuel ratio and is thus close to an output air-fuel ratio, it is possible to increase the output as compared with a case where the operation is performed at the theoretical air-fuel ratio. Furthermore, since the interior of the cylinder is cooled by latent heat of vaporization produced when the fuel is vaporized within the cylinder, the fuel injection described above facilitates the enhancement of the charging efficiency.

As the scavenging amount is increased, the amount of fuel necessary for making an air-fuel ratio in an exhaust pipe a desired air-fuel ratio is increased, and the air-fuel ratio within the cylinder correspondingly becomes rich. Hence, when the amount of fuel injected for making the air-fuel ratio in the exhaust pipe the desired air-fuel ratio is set, the valve overlap period is set according to the state of acceleration such that the scavenging amount is acquired to prevent the air-fuel ratio within the cylinder from exceeding a combustion limit. A relationship between the scavenging amount and the valve overlap period is previously determined according to the specifications of an internal combustion engine applied, and thus it is possible to easily set the valve overlap period based on the scavenging amount.

Incidentally, the scavenging effect can be obtained after the supercharging pressure exceeds a few thousand pascals [kPa], that is, after the collector pressure exceeds the atmospheric pressure plus a few thousands pascals [kPa].

Hence, during a time period until the supercharging pressure enough to obtain the scavenging effect after the start of acceleration, the supercharging efficiency is enhanced by the retarding of ignition timing. The "retard" mentioned here refers to the retarding of a normally set optimum ignition timing (MBT). The mechanism of enhancing the supercharging efficiency by the retarding of ignition timing is as follows.

The retarding of ignition timing delays ignition as compared with the MBT, and thus combustion is maintained even if an exhaust valve is opened, with the result that exhaust air having a higher temperature is exhausted into the exhaust passage 7. As the exhaust air has a higher temperature, energy for rotating the turbine 5B is increased, with the result that the rotation speed of the compressor 5A is increased to enhance the supercharging efficiency.

However, since the retarding of the ignition timing reduces the output as compared with the MBT, when the ignition timing is retarded before the supercharger 5 starts supercharging work, the acceleration performance is likely to be reduced instead.

Hence, the ignition timing is maintained at the MBT since the start of acceleration until the supercharger 5 starts the supercharging work, the ignition timing is retarded in a low supercharging region after the start of the supercharging work, a valve overlap is provided after the start of the main supercharging work, the ignition timing is returned to the MBT when the supercharging pressure is increased enough to obtain the scavenging effect and the valve timing is controlled so as to obtain the scavenging effect. A specific example of the control discussed above will be described with reference to FIG. 3.

Figure 3:
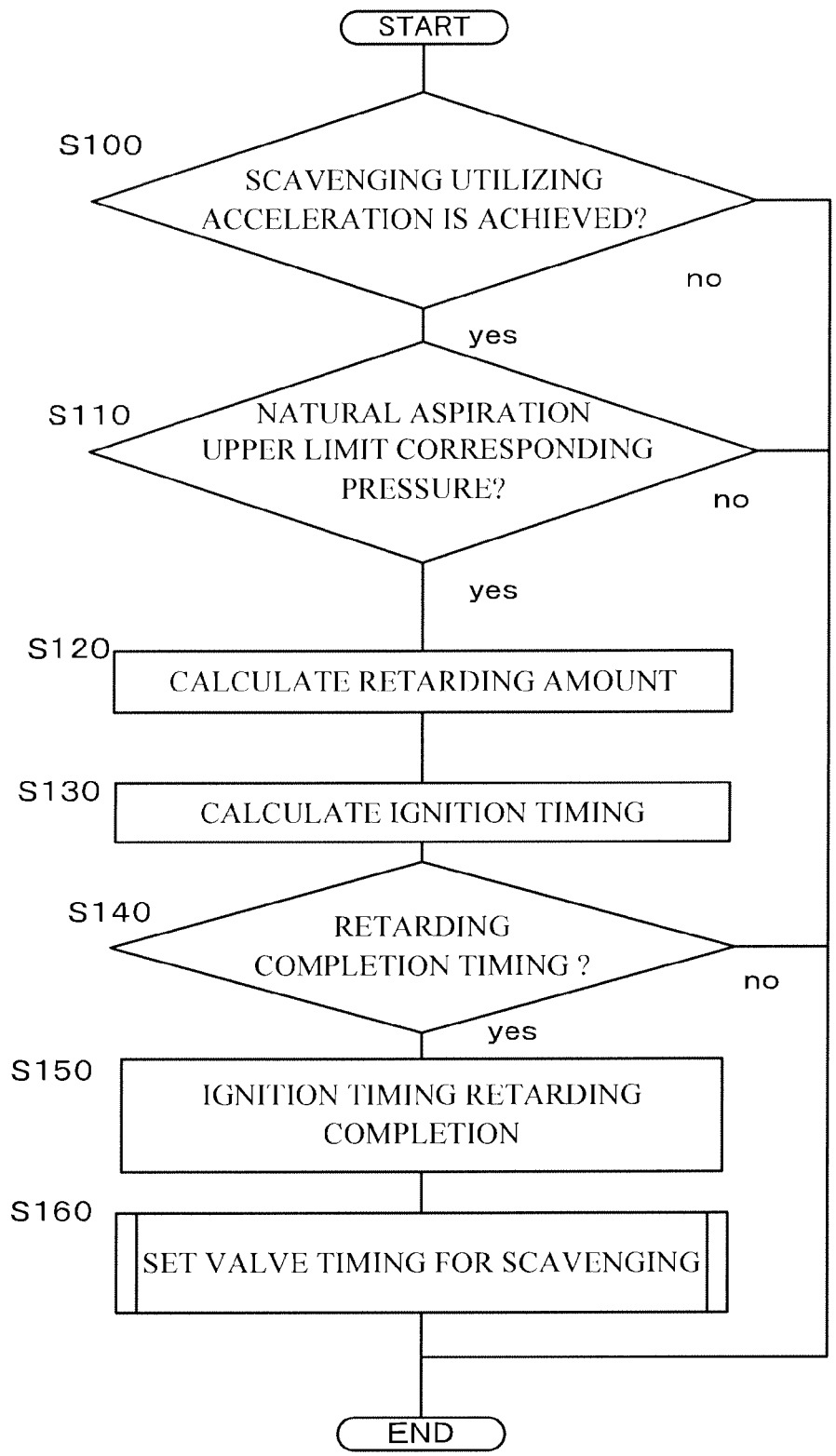
FIG. 3 is a flowchart showing a control routine of ignition timing and valve timing performed by a control unit at the time of acceleration.

FIG. 3 is a flowchart showing a control routine of the ignition timing and the valve timing at the time of acceleration. The present routine is repeated, for example, every about 10 mm seconds.

In step S100, the control unit 12 determines whether or not an acceleration request in which torque variations range from a non-supercharging state to a supercharging state is made, that is, whether or not a large effect is obtained by utilizing the scavenging effect and the like. For example, a determination is made based on the size of the accelerator pedal opening and its duration time, and if a predetermined accelerator pedal opening or more remains for a predetermined time or more, a yes determination is made. If a yes determination is made, the control unit 12 performs processing in step S110 whereas, if a no determination is made, the present routine is completed. If the no determination is made and then the present routine is completed, as a general internal combustion engine performs control, for example, the amount of fuel injected is increased according to the accelerator pedal opening.

The processing in step S110 and the subsequent steps may always be performed if the acceleration request is made. However, if torque variations for satisfying the acceleration request are low, effects obtained by performing the processing in step S110 and the subsequent steps are lowered.

In step S110, the control unit 12 determines whether or not the collector pressure detected by the intake air pressure sensor 19 reaches a pressure (hereinafter referred to as a natural aspiration upper limit corresponding pressure) corresponding to a throttle chamber at full throttle when the internal combustion engine 1 is assumed to an naturally-aspirated internal combustion engine. This determination is made to determine whether or not the supercharger 5 performs the supercharging work.

Since the natural aspiration upper limit corresponding pressure is the collector pressure with the throttle chamber 4 at full throttle and before the start of supercharging, though the natural aspiration upper limit corresponding pressure is considered to become the atmospheric pressure, in fact, the natural aspiration upper limit corresponding pressure is not increased to the atmospheric pressure by the influence of charging efficiency and the like, and thus becomes a pressure lower than the atmospheric pressure. In other words, when the collector pressure reaches the atmospheric pressure, the supercharger 5 performs even a small amount of supercharging work. Hence, the criterion is set not at the "atmospheric pressure" but at the natural aspiration upper limit corresponding pressure.

However, in the following description, a region until the collector pressure reaches the atmospheric pressure is referred to as a natural aspiration region, a region after the collector pressure exceeds the atmospheric pressure is referred to as a supercharging region.

If a yes determination is made in step S110, the control unit 12 performs processing in S120 whereas, if a no determination is made, the present routine is completed.

In step S120, the control unit 12 sets, as reference ignition timing, the amount of retard with respect to the MBT. Here, based on three elements, that is, an exhaust air temperature rise effect, a torque reduction effect and a turbine rotational speed rise effect produced by the retarding of the ignition timing, such a value as not to stagnate torque variations in the internal combustion engine 1 is set.

Although the specific amount of retard differs depending on the specifications of the internal combustion engine 1 or the supercharger 5, the amount of retard is characterized such that the amount of retard is the largest at the start of the retarding of the ignition timing and is gradually decreased as time passes.

In the timing at the start of the retarding of the ignition timing, since the rotational speed of the turbine 5B is still low, the rise of the exhaust air temperature is increased by increasing the amount of retard, and thus it is possible to rapidly increase the rotational speed of the turbine.

On the other hand, when the rotational speed of the turbine is increased to raise the supercharging pressure, since the amount of exhaust air exhausted from the internal combustion engine is increased, the rotational speed of the turbine is more likely to be increased even if energy supplied to the turbine 5B is not increased by the rise of the exhaust air temperature. Hence, the amount of retarding of the ignition timing is gradually decreased, and thus it is possible to reduce the amount of decrease in torque while rapidly increasing the rotational speed of the turbine.

In a general turbo-supercharger internal combustion engine, since the rotational speed of a turbine is not sufficiently increased when its torque is increased to the upper limit of the natural aspiration region, the rise of the torque is stagnated during a time period until the supercharging pressure has been increased after the entrance into the supercharging region, with the result that the acceleration is dropped. The drop in acceleration produced until the finally obtained acceleration is reached as described above is referred to as a turbo lag.

By contrast, in the present embodiment, since the ignition timing is retarded when the natural aspiration upper limit corresponding pressure is reached, as compared with a case where the ignition timing is not retarded, the upper limit of a torque in the natural aspiration region is low, and the drop in acceleration in the supercharging region is also low. Moreover, since the rotational speed of the turbine is rapidly increased by the retarding of the ignition timing, a time period during which the increase in torque is stagnated is reduced. In other words, since it is possible to reduce the drop in acceleration and the time period during which the acceleration is dropped, the turbo lag is reduced.

In step S130, the control unit 12 calculates, as the reference ignition timing, ignition timing that is retarded only by the amount of retard calculated from the MBT in step S120.

In step S140, the control unit 12 determines whether or not timing for completing the retarding of the ignition timing is reached, and performs processing in step S150 if the completion timing is reached or completes the present routine if the completion timing is not reached.

The timing for completing the retarding of the ignition timing is timing in which, even when the control for increasing energy supplied to the turbine 5B by the retarding of the ignition timing is completed, it is possible to obtain the scavenging effect of increasing the rotational speed of the turbine by the provision of the valve overlap. Specifically, it is timing in which the main supercharging work is started and a significant increase in supercharging pressure is started.

As a determination method, for example, a collector pressure capable of obtaining a target scavenging amount is previously set as a target collector pressure by the provision of the valve overlap, and timing when the collector pressure reaches the target collector pressure is determined to be the completion timing.)

The "target scavenging amount" described herein refers to a scavenging amount in which, even when the control for increasing the energy supplied to the turbine 5B by the retarding of the ignition timing is completed, it is possible to sufficiently increase the rotational speed of the turbine by the burning of exhaust air containing air corresponding to the scavenging within the exhaust manifold 3, for example, a value of 2 to 3% or more is set in terms of scavenging rate.

For example, the scavenging rate can be calculated by producing, for each rotational speed of the engine, a map where the scavenging rate is associated with a difference between the collector pressure and an exhaust pressure and a valve overlap amount, storing the map in the control unit 12 and retrieving the map. Hence, in step S140, it is possible to make a determination using the scavenging rate.

In step S160 which will be described later and in which the valve timing is changed, an operation delay time of the variable valve mechanism 14 is produced until desired valve timing is reached. Hence, in step S140, a collector pressure after the operation delay time is predicted based on the rate of change of the collector pressure and the like, and thus the change of the valve timing may be started when the predicted value reaches the target collector pressure. In this way, when the actual collector pressure reaches the target collector pressure, the change of the valve timing is completed.

In step S150, the control unit 12 completes the retarding of the ignition timing.

In step S160, the control unit 12 performs a subroutine that sets the valve timing for the scavenging.

Figure 4:
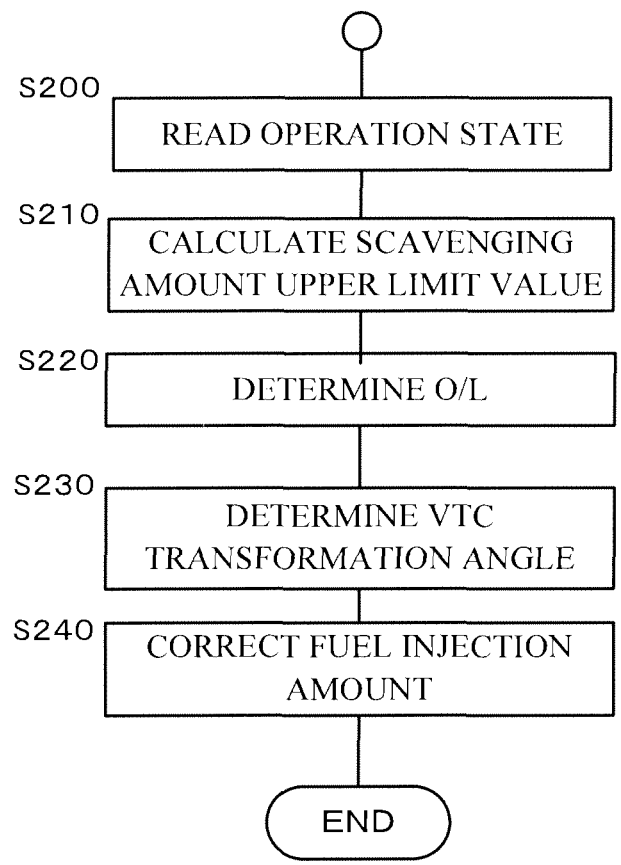
FIG. 4 is a flowchart showing a control routine for setting valve timing for scavenging performed by the control unit.

FIG. 4 is a flowchart showing a control routine that is performed by the control unit 12 and that sets the valve timing for the scavenging. In this control routine, the valve timing is changed according to the state of acceleration, and the mixture air containing air corresponding to the scavenging within the exhaust manifold 3 is controlled into a mixture air that is easily burned.

In step S200, the control unit 12 reads the state of operation, for example, the collector pressure, the rotational speed of the engine, an intake temperature, the atmospheric pressure and a basic injection pulse.

In step S210, the control unit 12 calculates a scavenging amount upper limit value determined from the state of operation described above.

The scavenging amount upper limit value is defined in order to reduce the degradation of the exhaust catalyst 18. Specifically, when the fuel is injected such that an air-fuel ratio containing a proportion corresponding to the scavenging within the exhaust manifold 3 becomes the theoretical air-fuel ratio, and the mixture air of the exhaust gas and the scavenging gas is burned within the exhaust manifold 3, as the scavenging amount is increased, the increase in the temperature of the exhaust catalyst 18 caused by the combustion is increased. Then, when the temperature is excessively increased, the exhaust catalyst 18 degrades exhaust air purification performance. Hence, the upper limit value of the scavenging amount for reducing the increase in the temperature of the exhaust catalyst 18 is set.

An example of a method of calculating the scavenging amount upper limit value will now be described. First, the collector pressure, the rotational speed of the engine, the basic injection pulse, the intake temperature and the atmospheric pressure are read. Then, a catalyst upper limit temperature that is an upper limit temperature for preventing the performance of the exhaust catalyst 18 from being degraded and a scavenging-free catalyst estimation temperature that is an estimation temperature of the exhaust catalyst 18 for preventing the mixture air of the scavenging gas and the exhaust gas from being burned in the current state of operation are calculated, and furthermore, a temperature difference (catalyst temperature rise permissible value at the time of scavenging) between the catalyst upper limit temperature and the scavenging-free catalyst estimation temperature is calculated. It is possible to permit, at the time of scavenging, only a temperature rise of the exhaust catalyst 18 corresponding to the catalyst temperature rise permissible value at the time of scavenging. In other words, a scavenging amount in which only a temperature rise corresponding to the catalyst temperature rise permissible value at the time of scavenging is produced at the time of combustion is the scavenging amount upper limit value. Hence, the scavenging amount upper limit value is calculated, from the catalyst temperature rise permissible value at the time of scavenging and the air-fuel ratio within the cylinder of the internal combustion engine 1, by retrieving the previously produced map.

In step S220, the control unit 12 determines the valve overlap period based on the scavenging amount determined in step S210. The scavenging amount and the valve overlap period are previously determined according to the specifications of an internal combustion engine applied, and thus it is possible to easily set the valve overlap period based on the scavenging amount.

In step S230, the control unit 12 determines a transformation angle of the variable valve mechanism 14 for realizing the valve overlap period determined in step S220. A relationship between the valve overlap period and the transformation angle is previously determined according to the profiles of the intake cam and the exhaust cam of the internal combustion engine 1 applied and the like, and thus it is possible to easily determine the transformation angle according to the valve overlap period.

In step S240, the control unit 12 corrects the amount of fuel injected such that the air-fuel ratio containing the proportion corresponding to the scavenging within the exhaust manifold 3 becomes the theoretical air-fuel ratio.

Figure 5:
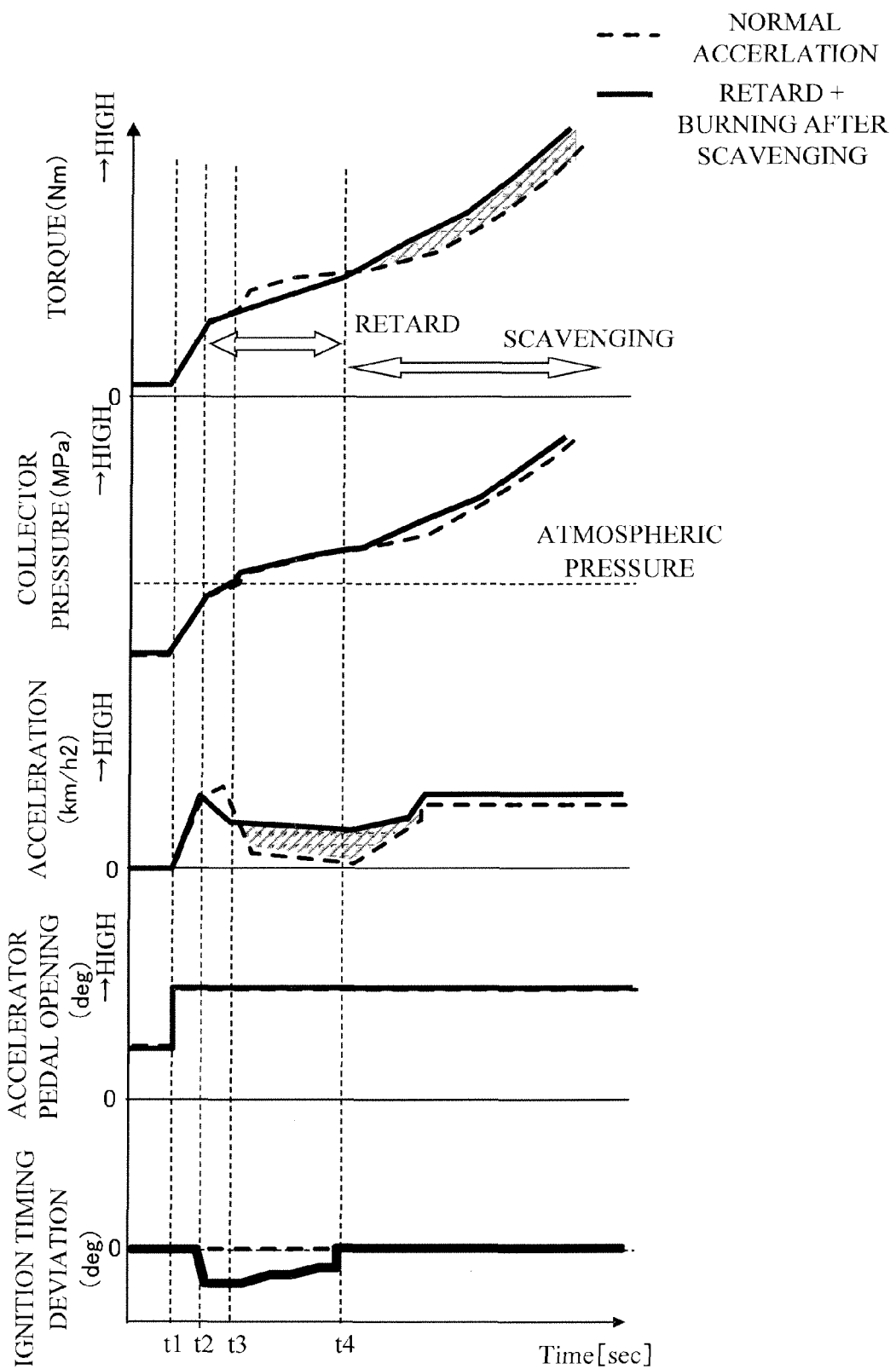
FIG. 5 is a time chart when the control of the present invention is performed.

FIG. 5 is a time chart showing results obtained by performing the control described above and shown in FIGS. 3 and 4. A solid line in the figure represents a case where control (hereinafter referred to as the present control) for switching between the retarding of the ignition timing and the scavenging is performed, and a broken line in the figure represents a case where normal acceleration without the control described above is performed.

The chart of an ignition timing deviation shows a deviation from the MBT as the reference ignition timing. Although the MBT is constantly changed according to the state of operation, since the chart shows a deviation, the MBT is indicated as a constant value.

It is assumed that, at timing t1, the accelerator is stepped on so as to achieve acceleration utilizing the scavenging. Until timing t2 at which the collector pressure reaches the natural aspiration upper limit corresponding pressure, there is no difference between the case where the present control is performed and the case of the normal acceleration.

In the present control, since the ignition timing is retarded at timing t2, thereafter, the torque is gently increased whereas the acceleration peaks at timing t2 and thereafter decreases. On the other hand, in the normal acceleration, since the ignition timing is not retarded, the torque is rapidly increased as compared with the case of the present control whereas the acceleration continues to increase even after timing t2, peaks at timing t3 when the natural aspiration region is completed and thereafter decreases.

In other words, in the present control, as compared with the case of the normal acceleration, the torque peak in the natural aspiration region is decreased, and thus the acceleration peak is decreased.

Thereafter, in the supercharging region, since in the present control, the energy fed to the turbine 5B is increased by the retarding of the ignition timing, the rotational speed of the turbine is rapidly increased whereas, since the amount of retard is decreased according to the increase in the rotational speed of the turbine, the torque is smoothly increased.

On the other hand, since in the normal acceleration, the ignition timing is not retarded, the torque in the supercharging region is higher than in the case of the present control, however, since the energy fed to the turbine 5B is low, the rotational speed of the turbine is low, the increase in the rotational speed of the turbine is reduced and the increase in the torque is stagnated.

Consequently, the drop in the acceleration in the supercharging region is greater than in the case of the normal acceleration. In other words, in the present control, the turbo lag is lower.

In the present control, between t2 and t4, the torque is lower but the rotational speed of the turbine is higher. The reason why the torque is lower in the present control is that, although the amount of intake air is increased according to the increase in the rotational speed of the turbine, the retarding of the ignition timing causes a torque to be unlikely to be produced.

Then, at timing when the main supercharging work is started, that is, at timing t4 when the retarding of the ignition timing is completed, in the present control, the retarding of the ignition timing is completed, and the control is switched to the valve timing control for scavenging effect. In this way, the mixture air of the scavenging gas and the exhaust gas is burned within the exhaust manifold 3, the energy fed to the turbine 5B is increased and the rate of increase in the torque is increased.

On the other hand, in the normal acceleration, in a short period of time after timing t4, the increase in the torque is stagnated, and the rate of increase in the torque is increased later than the case of the present control.

As described above, the torque peak in the natural aspiration region is reduced by the retarding of the ignition timing as compared with the case of the normal acceleration. Moreover, since the exhaust temperature is increased by the retarding of the ignition timing, the energy fed to the turbine 5B is increased by an increase in the volume of the exhaust gas and the rotational speed of the turbine 5B is rapidly increased. Furthermore, the amount of retarding of the ignition timing is gradually decreased according to the increase in the rotational speed of the turbine, and thus the torque is smoothly increased. Consequently, it is possible to reduce the turbo lag and rapidly increase the supercharging pressure at the same time.

After the start of the main supercharging work, the mixture air containing air corresponding to the scavenging is burned within the exhaust manifold 3, and thus it is possible to more rapidly increase the torque.

In other words, a high torque is rapidly produced, and thus it is possible to reduce a time period until the completion of the acceleration and provide a smooth acceleration feel to a driver.

As described above, according to the present embodiment, the following effects are obtained.

When the acceleration request is detected, since the ignition timing is retarded in the low supercharging region, the acceleration peak in the natural aspiration region is decreased, the rotational speed of the turbine is more rapidly increased by an increase in the exhaust temperature and the turbo lag is reduced. Then, in the high supercharging region, the correction of the retarding of the ignition timing is completed, the valve overlap is provided and the amount of fuel injected is set such that the mixture air containing the scavenging gas within the exhaust manifold 3 has the theoretical air-fuel ratio, with the result that the torque is rapidly increased by energy resulting from the afterburning of the mixture air of the scavenging gas and the exhaust gas. In other words, it is possible to reduce the turbo lag and rapidly increase the torque at the same time.

The retarding of the ignition timing is started at timing when the supercharging is started, the valve overlap is provided and thus the retarding of the ignition timing is completed at timing when the supercharging pressure for obtaining the scavenging effect is reached, with the result that it is possible to reduce stagnation present until a significant increase in the torque is started after the main supercharging is started.

Since the ignition timing is retarded when the acceleration request necessary to transfer the non-supercharging state to the supercharging state is received, it is possible to reduce the stagnation of the increase in the torque which is problematic in a region where the torque is significantly changed and the turbo lag is present.

The amount of correction of the retarding of the ignition timing is maximized at the start of the correction of retarding, and is gradually decreased as the rotational speed of the supercharger is increased. In other words, the exhaust temperature is significantly increased as the amount of flow of the exhaust air is lowered, and the increase in the exhaust temperature is reduced as the amount of flow of the exhaust air is increased, with the result that the amount of decrease in the torque caused by the retarding of the ignition timing is reduced. In this way, it is possible to increase the torque smoothly and rapidly at and after the start of the supercharging.

Although the embodiment of the present invention has been described above, the embodiment described above simply indicates part of the example of the application of the present invention, and is not intended to limit the technical scope of the present invention to the specific configuration of the embodiment described above.

The present application claims priority based on Japanese Patent Application No. 2011-23880 filed in Japan on Feb. 7, 2011, the content of which is incorporated herein by reference.

The invention claimed is:

1. A control device of an internal combustion engine that includes a supercharger configured to be driven by exhaust energy, and a variable valve mechanism configured to be able to change valve timing, the control device comprising:
- a valve timing change unit configured to control the variable valve mechanism;
- an ignition timing change unit;
- a fuel injection amount change unit;
- an acceleration request detection unit configured to detect an acceleration request from a driver;
- a supercharging pressure detection unit configured to detect a supercharging pressure produced by the supercharger; and
- an acceleration control unit configured to:
  - correct, when the acceleration request is detected, an ignition timing to a retard side in a low supercharging region where the supercharging pressure is lower than a supercharging pressure at which a scavenging effect occurs,
  - complete a correction of a retarding of the ignition timing in a high supercharging region where the supercharging pressure is equal to or higher than the supercharging pressure at which the scavenging effect occurs to provide a valve overlap, and
  - change a fuel injection amount in the high supercharging region such that an air-fuel ratio of a mixture air of a scavenging gas and an exhaust gas within an exhaust passage becomes a stoichiometric air-fuel ratio.

2. The control device of the internal combustion engine according to claim 1,
wherein the acceleration control unit starts the correction of the retarding of the ignition timing at a timing when a supercharging is started by the supercharger, and completes the correction of the retarding of the ignition timing at a timing when a supercharging pressure capable of obtaining a scavenging effect by provision of the valve overlap is reached.

3. The control device of the internal combustion engine according to claim 2,
wherein the supercharging pressure detection unit detects a supercharging pressure indirectly by detecting a collector pressure which is an air intake passage internal pressure by a side of a lower stream of a compressor of the supercharger, and
wherein the acceleration control unit determines, based on the collector pressure, the timing when the supercharging pressure capable of obtaining the scavenging effect by provision of the valve overlap is reached.

4. The control device of the internal combustion engine according to claim 1,
wherein the acceleration control unit carries out the retard correction of the ignition timing when an acceleration request necessary for the supercharger to transfer from a non-supercharging state to a supercharging state is received.

5. The control device of the internal combustion engine according to claim 1,
wherein an amount of the correction of the retarding of the ignition timing is maximized at a start of the correction of the retarding, and is gradually decreased as a rotational speed of the supercharger is increased.

6. A control device of an internal combustion engine that includes a supercharger which is driven by exhaust energy, and a variable valve mechanism which can change valve timing, the control device comprising:
- a valve timing change means for controlling the variable valve mechanism;
- an ignition timing change means;
- a fuel injection amount change means;
- an acceleration request detection means for detecting an acceleration request from a driver;
- a supercharging pressure detection means for detecting a supercharging pressure produced by the supercharger; and
- an acceleration control means for
  - correcting, when the acceleration request is detected, an ignition timing to a retard side in a low supercharging region where the supercharging pressure is lower than a supercharging pressure at which a scavenging effect occurs,
  - completing the correction of a retarding of the ignition timing in a high supercharging region where the supercharging pressure is equal to or higher than the supercharging pressure at which the scavenging effect occurs to provide a valve overlap, and
  - changing a fuel injection amount in the high supercharging region such that an air-fuel ratio of a mixture air of a scavenging gas and an exhaust gas within an exhaust passage becomes a stoichiometric air-fuel ratio.

* * * * *